(12) United States Patent
Lynker

(10) Patent No.: US 7,939,459 B2
(45) Date of Patent: May 10, 2011

(54) BAKED REFRACTORY PRODUCT

(75) Inventor: Andreas Lynker, Lollar (DE)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 179 days.

(21) Appl. No.: 12/375,292

(22) PCT Filed: Aug. 8, 2007

(86) PCT No.: PCT/EP2007/006998
§ 371 (c)(1),
(2), (4) Date: Jan. 27, 2009

(87) PCT Pub. No.: WO2008/025440
PCT Pub. Date: Mar. 6, 2008

(65) Prior Publication Data
US 2010/0016146 A1    Jan. 21, 2010

(30) Foreign Application Priority Data

Aug. 28, 2006  (DE) .......................... 10 2006 040 270

(51) Int. Cl.
*C04B 35/043*  (2006.01)
*C04B 35/443*  (2006.01)

(52) U.S. Cl. .................................................... 501/120
(58) Field of Classification Search .................. 501/120
See application file for complete search history.

(56) References Cited

U.S. PATENT DOCUMENTS

| 4,775,648 | A | 10/1988 | Bartha et al. |
| 6,274,525 | B1 * | 8/2001 | Zborowski et al. ........... 501/120 |
| 7,244,687 | B2 | 7/2007 | Eder et al. |
| 7,528,085 | B2 * | 5/2009 | Buchberger et al. ........ 501/120 |
| 7,767,292 | B2 * | 8/2010 | Djuricic et al. ............ 428/314.2 |
| 2005/0255986 | A1 * | 11/2005 | Kaneshige et al. .......... 501/120 |
| 2008/0160279 | A1 | 7/2008 | Djuricic et al. |
| 2008/0254967 | A1 | 10/2008 | Buchberger et al. |

FOREIGN PATENT DOCUMENTS

| DE | 3527789 | C3 | 2/1987 |
| DE | 10054125 | A1 | 5/2002 |
| DE | 102004007062 | A1 | 9/2005 |
| EP | 0113886 | B1 | 9/1986 |
| WO | 2004048290 | A1 | 6/2004 |
| WO | 2004065323 | A1 | 8/2004 |
| WO | 2007006350 | A1 | 1/2007 |

OTHER PUBLICATIONS

Chemical Abstracts; Nov. 26, 1990; p. 325, American Chemical Society.

* cited by examiner

*Primary Examiner* — Karl E Group
(74) *Attorney, Agent, or Firm* — Christopher L. Parmelee; Walker & Jocke

(57) ABSTRACT

The invention relates to a baked refractory ceramic product. According to the invention, both shaped and unshaped products come within this generic term. Shaped products are those which have a defined shape, so that they can be ready-made at the manufacturer's premises. The shaped products include: bricks, nozzles, tubes, stoppers, plates, etc. The products categorized as unshaped products include those which are usually produced at the user's premises from a suitable material. These include bottoms of furnace assemblies which are cast from a material, but also repair materials, etc.

10 Claims, 1 Drawing Sheet

BAKED REFRACTORY PRODUCT

The invention relates to a fired refractory ceramic product. According to the invention, this generic term covers both moulded (shaped) and unmoulded (unshaped) products. Shaped products are those that have a defined shape so that they can be assembled ready to use by the manufacturer. Shaped products include: bricks, nozzles, tubes, stoppers, plates etc. The term unshaped products includes those that are mostly made by the user from an appropriate material (monolithic). They include furnace bottoms that are cast from a monolithic mass, but also repair masses etc.

The moulded products can be supplied to the user fired or unfired. Like the unmoulded products, the moulded products are also fired at the latest during their use in that they are heated at least up to temperatures at which the batch components sinter.

In this context, the term refractory batch material comprises both materials that already have refractory properties and also materials that only become refractory during/after heat treatment (firing).

Refractory ceramic products of this type have been known for some time in numerous embodiments. The requirements for such products depend upon the respective application. Fundamentally, a high heat resistance is required. Products that are heat-resistant up to 1300° C. are often sufficient for lining rotary cement kilns. Refractory ceramic products for metallurgical applications (lining melting vessels, nozzles, stoppers, gas purging plugs, slide plates etc) conventionally have a heat resistance of at least 1400 to 1700° C. The refractoriness of products for lining waste incineration plants is conventionally between 1300 and 1500° C. A heat resistance of over 1700° C. is required for example for the following applications: glass melting tanks, units for the production and treatment of metal melts.

Other principal property features are: thermal shock resistance, corrosion behaviour, structural elasticity, refractoriness under load, gas permeability, cold crushing strength, optionally also after changes of temperature, high-temperature flexural strength.

Also in this respect, the specific product requirements are dependent upon the specific applications. For example, the following criteria apply to products for lining glass melting tanks: glass tanks are mostly lined with large-size refractory bricks (for example 1.0×0.5×0.5 m). For this application, therefore, an improvement (reduction) of the brittleness in addition to a low susceptibility to corrosion is aimed for.

DE 100 54 125 A1 describes a batch for the production of a refractory ceramic product. The batch contains a melt phase former as the principal component which forms a melt/glass phase at operating temperatures of 700 to 1300° C. This melt phase should fill the open porosity of the product as far as possible in order to achieve as dense as possible a product after firing.

The invention is based on the objective of providing a refractory ceramic product which is also suitable for high temperature applications (>1500° C., also >1700° C.) and in addition to the high heat resistance cumulatively has as many of the following properties as possible: a good thermal shock resistance, a high cold crushing strength after changes in temperature, a low gas permeability. It should preferably be usable in units with a reducing and/or oxidising atmosphere.

Extensive tests were carried out to achieve these objectives. The following information inter alia was thereby achieved:

In addition to the chemical composition, the structure of the fired product predominantly plays a crucial role.

The absolute value for the open porosity is not critical. The type and formation of the pores, however, has a strong influence on the product properties. The porosity can likewise be specifically influenced by the selection of specific batch components and grain sizes.

The same applies to the structural elasticity.

The required properties are achieved by a structure which in addition to coarse MgO particles has a matrix based on MA ($MgO.Al_2O_3$) spinel resulting from fine-particle (<100 μm) batch components.

The matrix should consist predominantly, at best completely, of MA spinel. At most, minimal contents of free MgO particles are permitted according to the invention. The content thereof should be <1.0% by mass, at best <0.5% by mass or <0.1% by mass, based on the total matrix.

The MA spinel of the matrix can, pre-synthesised, be a component of the batch. It is advantageous if the spinel is formed proportionally in situ on firing. Aluminium oxide ($Al_2O_3$) in the batch thereby reacts with the MgO fine grain content and/or in the surface area of the MgO coarse particles. The phase reformation (in situ formation of MA spinel) is linked to an increase in volume.

The different thermal elongation and contraction of MgO and MA spinel is used to form crack-like cavities between the two structural phases.

The open porosity is determined within the fine-particle matrix and by the crack-like (gap-like) pores around the coarse particles. The pores end on the coarse-grained (mostly dense) MgO particles.

The content of MgO coarse grains should be over 50% by mass, for example 52 to 60% by mass. The remainder is predominantly characterized by the MA spinel matrix.

The product properties can be influenced by a grain gap between MgO coarse grains and the fine-grain constituents of the batch. The MgO coarse grain can be used at a grain size of >0.5 mm but also >1 mm in the batch. The constituents that should form the matrix are used predominantly at ($d_{90}$)<100 μm, often also <50 μm. The grain size hardly changes on firing. There is, however, sintering and therefore binding of smaller individual grains or the formation of bridges between the batch particles. The grain "grows" somewhat due to spinel formation on the surface of the grain.

DETAILED DESCRIPTIONS OF EXEMPLARY EMBODIMENTS

Figure 1:
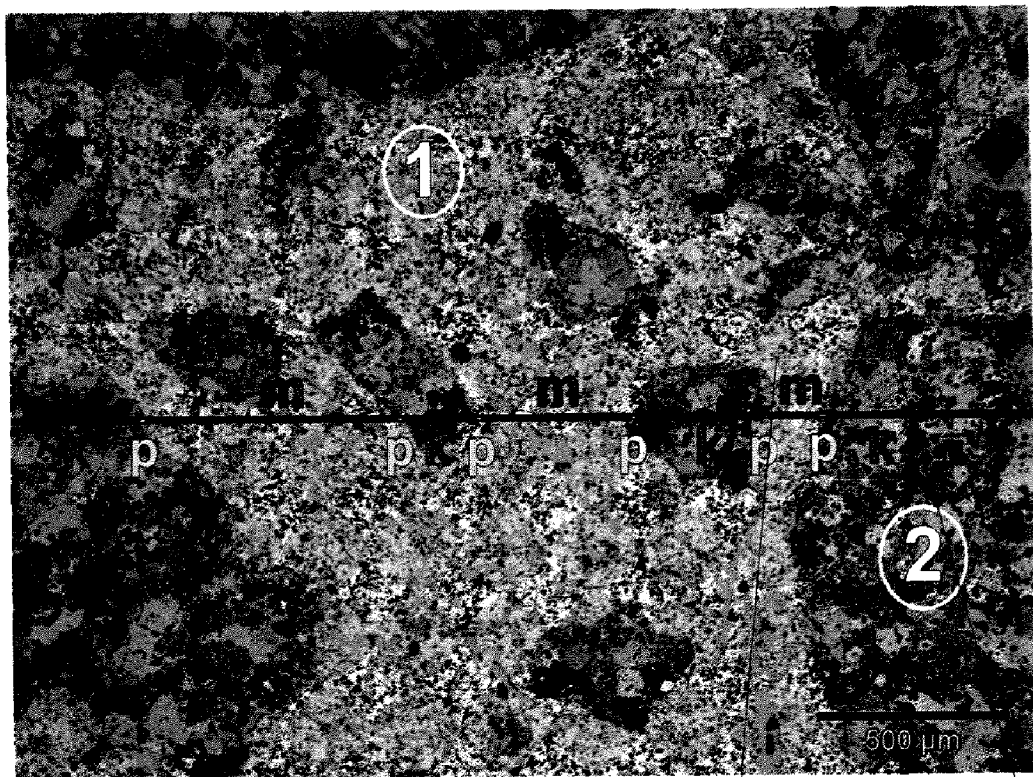
FIGS. 1 and 1a show structural images of a refractory product.

In its most general embodiment, the invention relates to a fired refractory product, the structure of which comprises an MA spinel matrix ($1^{st}$ structural phase) in which MgO coarse grains with a particle size of $d_{90}$>300 μm ($2^{nd}$ structural phase) are present, wherein three-dimensional crack-like pores are formed between the two structural phases.

The pores (distance between coarse grain and surrounding spinel matrix) should, according to one embodiment, extend over more than 50% of the relevant coarse grain surface. This value can be increased to 60%, 70%, 75%, 80%, 90%. In concrete terms, this means that an MgO coarse grain with a surface area X of maximum up to 0.5 X is in contact with the surrounding matrix material. The crack-like pores which extend along the surface of the MgO coarse grains make up maximum 1/20 of the volume content of the MgO coarse grains according to one embodiment. The value can be reduced to 1/30, 1/50, 1/70 or 1/100, wherein minimum values can be 1/100, 1/80, 1/60, 1/40 or 1/25.

The product should comprise at least 98, better >99% by mass, MgO coarse grain plus MA spinel matrix besides technically caused "impurities". The $SiO_2$ content is at best <1.5% by mass or <0.5% by mass. The formation of magnesium-aluminium silicates is thereby to the greatest possible extent prevented.

Such a product can be produced from a batch that comprises, in addition to MgO coarse grain with a grain size of $d_{90}$>300 μm, at least one fine-particle component with a grain size of $d_{90}$<100 μm from the $Al_2O_3$ group (or $Al_2O_3$+MgO) and/or pre-synthesised MA spinel.

If the content of secondary spinel, thus spinel that is only formed when the product is fired for the first time, is at least 10% by mass, based on the total product, it has proved favourable. This means that in addition to a pre-synthesised MA spinel (as a constituent of the fine-particle component) the corresponding batch contains $Al_2O_3$ which can react with MgO (for example that of the MgO coarse grains), or a mixture of fine-particle $Al_2O_3$ and MgO (proportional) for the direct in situ formation of MA spinel.

Contents of free, fine-particle $Al_2O_3$ in the batch furthermore have the advantage that any undesired contents of free MgO, particularly within the fine grain component, are converted to MA spinel during firing.

In this regard, the invention strives to achieve a fired product which, with the exception of the MgO coarse grain, on a technical scale is free of free MgO. In any case, the corresponding content within the fine-particle matrix should be limited such that, based on the total product, it is <1.0% by mass.

Free aluminium oxide in the structure of the fired product should also be avoided as far as possible.

The fired product described makes the MgO coarse grain the principal component in regard to the improved ductility of the product, the cold crushing strength of which (according to EN 993-5) can be >50 MPa. This is the reverse of conventional MA spinel bricks in which the spinel grain creates the actual flexibility of the structure. The MgO coarse grain is also positive for processing of the batch. For example, the wear of compression moulds in the use of the batch according to the invention is much lower in comparison to batches with a hard MA spinel coarse grain.

In contrast to the teaching of DE 100 54 125 A1, pores according to the invention are not filled by means of elevated contents of melt phase; on the contrary, the crack-like pores between the two structural phases are quite essential for the product properties. At 1500° C., products according to the invention should form <5% of the melt phase.

The MgO grains present in a spinel matrix make the structure so flexible that corresponding products, such as bricks, can be used even in rotary kilns, such as used for example for cement production.

Other possibilities for use are:
bricks for lining glass melting tanks
bricks (such as checker bricks) for use in regenerators of glass tanks, in particular in the sulfate condensation zone of such regenerators, in particular under reducing conditions.

The total open porosity of the fired product is conventionally <20% v/v, often <17% v/v, but can also be 15% v/v (determined in accordance with EN 993 part 1).

The crack-like pores essential for the structure of a product according to the invention define a pore space/pore halo around the coarse MgO grains, not actually complete, but over considerable part of the respective coarse grain surface.

A synthetic sinter magnesia for example can be used as the MgO base material, but also fused magnesia or MgO fired from natural magnesite. The MgO coarse grain (the particles of the second structural phase) regularly have a grain size of <8 mm, mostly <6 mm, often also <4 mm.

The fired product should substantially be characterised by the two structural phases and the pores in between. Accordingly, the batch should contain additional components in contents as low as possible, conventionally <3 by mass percentage.

The batch is processed conventionally, for example with a temporary binder (such as a lignin sulfonate solution). The mixture is then compressed to bricks, dried and fired for example at 1500-1600° C.

Figure 1A:
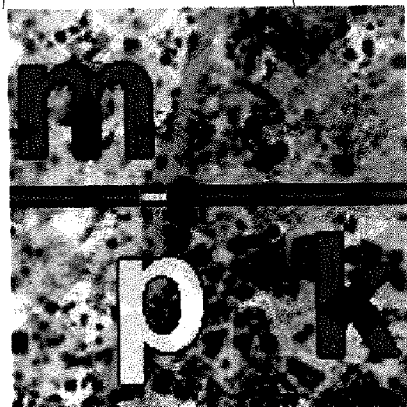

FIG. 1 shows a typical structural image of a product according to the invention, including the marked section enlargement (FIG. 1a).

Structural phase 1, i.e. the MA spinel matrix, is marked 1 (or m), the coarse MgO grains (=$2^{nd}$ structural phase) 2 (or k). The spinel matrix was formed from fine-particle batch components on firing. The structure contains approx. 10% by mass secondary spinel which was only formed on firing.

The coarse MgO grains are separated from the surrounding matrix over large areas of its surface by three-dimensional crack-like pores (p). These pores were formed by different thermal elongation behaviour of the structural phases and the in situ spinel formation during firing of the product. FIG. 1 also shows the principle of the applied method for determining the structural phases by means of direct-light microscopy. The method described in Radex-Rundschau 1988, volume 4, pages 172-182, allows the determination of volume contents of various structural phases by the line cut method. Such a line is marked in FIG. 1 and shows that such pores (p) are present on virtually all surfaces of the MgO coarse grains. The concrete evaluation is carried out as follows: The ground section is superposed with randomly selected measuring lines. The chord lengths of the cut phases, grain (k), pore/pore halo (p) and matrix (m), are measured along these lines. The volume content of a phase corresponds to the number of measuring lines within a phase on the total measuring line, see also equation [1]:

$$V_x = (\Sigma L_x)/L_{tot} \quad [1]$$

$V_x$ ... volume content of phase x in [% v/v]
x ... phase: grain k, pore halo p, matrix m
$L_x$ ... chord length within phase x
$L_{tot}$ ... total length of the measuring line For a representative and reproducible evaluation, 50 to 100 lines per ground section should be evaluated, wherein the lines run in different directions. In addition, at least three ground sections in three different directions of the coordinate system should be taken as a basis. The volume contents of the structural phases and pores are obtained from the mean calculation of the individual data thus obtained.

The invention claimed is:
1. Fired refractory product, the structure of which being defined by an MA spinel matrix (1st structural phase) resulting from fine particle batch components of <100 μm in which MgO coarse grains with a particle size of $d_{90}$>300 μm (2nd structural phase) are present, wherein three-dimensional gap-like pores are formed between the two structural phases around the MgO coarse grains, and the product comprises at least 98% by mass of the MgO coarse grains plus the MA spinel matrix.

2. Product according to claim 1, in which the gap-like pores extend over more than 50% of the surface of the MgO coarse grain.

3. Product according to claim 1, in which the gap-like pores comprise maximum 1/20 of the volume content of the MgO coarse grain.

4. Product according to claim 1, with an open porosity of up to 20% v/v.

5. Product according to claim 1, with a cold crushing strength of $\geq 50$ MPa.

6. Product according to claim 1, in which the content of the MgO coarse grains is over 50% by mass.

7. Product according to claim 1, in which the content of the MgO coarse grains is between 60 and 80% by mass.

8. Product according to claim 1, with a particle size $d_{90}$ of the MgO coarse grains of >500 μm.

9. Product according to claim 1, which at application temperatures of up to 1500° C. forms less than 5% by mass of a melt phase.

10. Fired refractory product, the structure of which being defined by an MA spinel matrix (first structural phase) resulting from fine particle batch components of <100 μm in which MgO coarse grains with a particle size of $d_{90}$>300 μm (second structural phase) are present, wherein three-dimensional gap-like pores are formed between the two structural phases, the gap-like pores extend over more than 50% of the surface of the MgO coarse grains and the product comprises at least 98% by mass of the MgO coarse grains plus the MA spinel matrix.

* * * * *